US007021168B2

(12) United States Patent
Bürkle et al.

(10) Patent No.: US 7,021,168 B2
(45) Date of Patent: Apr. 4, 2006

(54) GEARBOX EMBODIED WITH A LAYSHAFT

(75) Inventors: Rolf Bürkle, Ravensburg (DE); Hermann Lanz, Frickingen (DE); Martin Lamke, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 44 days.

(21) Appl. No.: 10/491,302

(22) PCT Filed: Oct. 16, 2002

(86) PCT No.: PCT/EP02/11538

§ 371 (c)(1),
(2), (4) Date: Mar. 30, 2004

(87) PCT Pub. No.: WO03/033941

PCT Pub. Date: Apr. 24, 2003

(65) Prior Publication Data

US 2004/0237680 A1 Dec. 2, 2004

(30) Foreign Application Priority Data

Oct. 19, 2001 (DE) ................................ 101 51 752

(51) Int. Cl.
*F16H 3/091* (2006.01)

(52) U.S. Cl. ............................ 74/325; 74/333; 74/378; 74/665 GC

(58) Field of Classification Search .................. 74/325, 74/333, 665 GC, 15.66, 378; 475/207
See application file for complete search history.

(56) References Cited

U.S. PATENT DOCUMENTS

| | | | | |
|---|---|---|---|---|
| 681,718 | A * | 9/1901 | Martin | 74/333 |
| 1,657,871 | A | 1/1928 | Smith | |
| 1,817,819 | A | 8/1931 | Healey | |
| 2,423,886 | A * | 7/1947 | Hindmarch | 74/378 |
| 2,430,169 | A * | 11/1947 | Grant | 74/325 |
| 2,732,189 | A * | 1/1956 | Gerst | 475/207 |
| 3,803,934 | A | 4/1974 | Yokel | 74/361 |
| 3,859,870 | A | 1/1975 | Whateley | 74/745 |
| 4,188,833 | A | 2/1980 | Krauss et al. | 74/417 |
| 4,735,104 | A * | 4/1988 | Giurati et al. | 74/417 |
| 4,838,105 | A | 6/1989 | Yano et al. | 74/377 |

FOREIGN PATENT DOCUMENTS

| | | | |
|---|---|---|---|
| DE | H7808 | 10/1955 | |
| DE | 2 355 125 | 6/1974 | |
| DE | 100 39 314 A1 | 2/2002 | |
| EP | 0 041 925 | * 12/1981 | 475/207 |
| EP | 0 205 111 A1 | 12/1986 | |
| FR | 2 508 132 | 12/1982 | |
| GB | 1114805 | 5/1968 | |
| GB | 1116830 | 6/1968 | |
| JP | 49-21556 | 2/1974 | |

* cited by examiner

*Primary Examiner*—Sherry Estremsky
(74) *Attorney, Agent, or Firm*—Davis & Bujold, P.L.L.C.

(57) ABSTRACT

A selector transmission with countershaft design is described which comprises one input shaft (2), one output shaft (3), one main shaft (4) situated therebetween and one countershaft (5) interacting with the main shaft (4), shiftable gear wheel pairs being located upon the main shaft (4) and the countershaft (5). The main shaft (4) and the countershaft (5) are disposed at an angle (α) to each other.

10 Claims, 4 Drawing Sheets

GEARBOX EMBODIED WITH A LAYSHAFT

This application is a national stage completion of PCT/EP02/11538 filed Oct. 16, 2002 which claims priority from German Application Serial No. 101 51 752.1 filed Oct. 19, 2001.

FIELD OF THE INVENTION

The invention relates to a selector transmission in countershaft design, in particular, for a motor vehicle with one input shaft connectable with a prime mover, one output shaft connectable at least with one drive axis, one main shaft situated therebetween and one countershaft interacting with the main shaft, shiftable gear wheel pairs being situated upon the main shaft and countershaft.

BACKGROUND OF THE INVENTION

In selector transmissions of countershaft design, particularly for industrial vehicles, the center distance between the main shaft of the transmission and the countershaft constitutes a central factor. The greater the torque to be transmitted, the greater the center distance has to be selected. At the same time, the center distance should be laid out rather small for the higher gears, that is, for low ratios and rather large for the lower gears, that is, for high ratios. The center distance is a compromise between the ideal dimensions of the individual ratio steps.

One other general condition for the selection of the center distance in selector transmissions is constituted by tying of a power takeoff in industrial vehicle transmissions, especially in range transmissions having planetary drive as group transmission. The center distance must be selected large enough to make passing the adapter shaft for the power take off possible past the parts connected with the main shaft such as a planetary gear set.

Depending on the structural configuration of the transmission and the support of the shafts provided therein, an adapter shaft is situated between one countershaft and one power takeoff, the adapter shaft being coaxial with the countershaft and connected therewith via a spline section for torque transmission. In order that the power takeoff and the main output of the transmission can be provided next to each other, a minimum distance must be kept between the adapters on the power takeoff and on the main output connected with a prop shaft, which minimum distance has to be taken into account in the construction. This, in turn, requires on the shaft gear wheels with correspondingly large diameters and weight, which has a disadvantageous effect upon the total weight of the transmission.

In order to keep the center distance between the shafts small, it is thus already known, for example, to actuate the adapter shaft via a spur gear toothing such as the intermediate wheel of the reverse gear so as thereby to arrange the direction of rotation of the adapter shaft, according to the direction of rotation of the countershaft. Thereby an additional gearing has to be mounted on the adapter shaft and the adapter shaft needs additional support. To be able to absorb the torques of the power take off, the supports of the intermediate wheel of the reverse gear must be made reinforced accordingly. The toothing of the intermediate wheel of the reverse gear must thus be laid out on the power takeoff and the stress thereof.

In the applicant's still unpublished DE 100 39 314, a vehicle having a power takeoff shaft is described which comprises one adapter shaft connected with a countershaft parallel with the main output shaft of the vehicle transmission. The adapter shaft is disposed at an angle to the countershaft so that the distance of the power takeoff connection on the output of the vehicle transmission from the axis of rotation of the main output shaft is greater than the center distance between the axis of rotation of the countershaft and the axis of rotation of the main output shaft. The connection between the countershaft and the adapter shaft has a spline section, specially a section with a spiral toothing.

Departing from the above cited prior art, the problem on which this invention is based is to make possible a variable center distance between the main shaft and the countershaft of a selector transmission overcoming the disadvantages of the prior art. In a selector transmission of standard countershaft design, the center distance on the constant ratio on the input side must be smaller and in case of high ratios, the center distance on the output side must be larger. Besides, in a selector transmission with power takeoff, the distance of the power takeoff flange from the main shaft should be increased or independent of the established center distance.

SUMMARY OF THE INVENTION

In a selector transmission of countershaft design, according to the invention, the main shaft and the countershaft are disposed at an angle to each other. By virtue of this non-paraxial arrangement of the main shaft and of the countershaft of a selector transmission, several advantages are obtained. On one hand, the optimal center distance in low and high ratios is almost freely selectable, on the other, when designing a transmission with a power takeoff shaft, a sufficiently large distance of the power takeoff from the main shaft can be adjusted.

In a first preferred design of the invention, it is proposed that the main shaft and the output shaft be disposed coaxially with the input shaft and the countershaft at an angle with the input shaft. Hereby is given, from a construction point of view, a relatively simple design of the selector transmission, since the input, the output and the main shaft extend coaxially with each other.

Seen in position of installation in a motor vehicle, for example, the countershaft is situated here at the side of the main shaft. Thereby advantageously results a design of the transmission as space saving as possible.

In another advantageous design of the invention, it is proposed to situate the countershaft paraxially with the input shaft and the main shaft including the output shaft at an angle to the input shaft. Again, seen in position of installation of the transmission in a motor vehicle, for example, the countershaft is located here above the main shaft so that, for example, the deflection angle of a universal joint rear-mounted on the output shaft is now advantageously smaller than in a transmission with paraxial main shaft and countershaft.

For the connection of the input and of the main shafts, one bevel drive such as a crown wheel or beveloid toothing, is provided. Therewith a direct gear can advantageously be engaged between the input shaft and the main shaft or the output shaft which balances the differential angle between the input and the main shafts.

The support of the main shaft in the input shaft is advantageously designed as an oscillating tapered roller bearing and the ideal points of rotation of the bevel drive the same as of the oscillating tapered roller bearing are identical.

To make the center distance possible between the main shaft and the countershaft, the gear wheels that determine the shift steps are designed as beveloid wheels. It is advantageous respectively to design one wheel of a gear wheel pair such as the wheel located upon the main shaft as cylindrical gear wheel and the corresponding wheel such as the wheel upon the countershaft as beveloid wheel or vice versa. Depending on the use, the two wheels, both the one upon the main shaft, and the one upon the countershaft can also be designed as beveloid wheels.

In one development of the invention, for example, for use in an industrial vehicle, the countershaft is connected with an adapter shaft for a power takeoff. The center distance between the adapter shaft and the main shaft is dimensioned so that, for example, one planetary gear disposed upon the main shaft with certainty does not collide with the adapter wheel.

The use in a motor vehicle, specially an industrial vehicle, of a selector transmission with countershaft design, according to the type described above, is advantageously proposed.

The above described selector transmission can obviously be also used in a vehicle other than the above described, such as a ship propulsion system, wherein the helix angle of the spiral shaft required in a vehicle propulsion system is adjustable especially due to the slanted position of the main shaft relative to the input shaft.

Other objectives, advantages and developments of the transmission result from the description that follows of the embodiments shown in detail in the Figures. All described and/or graphically represented features or characteristics constitute per se or in any suitable combination the object of the invention independently of the summing up in the claims and of the references.

BRIEF DESCRIPTION OF THE DRAWINGS

The invention will now be described, by way of example, with reference to the accompanying drawings in which.

DETAILED DESCRIPTION OF THE INVENTION

Figure 1:
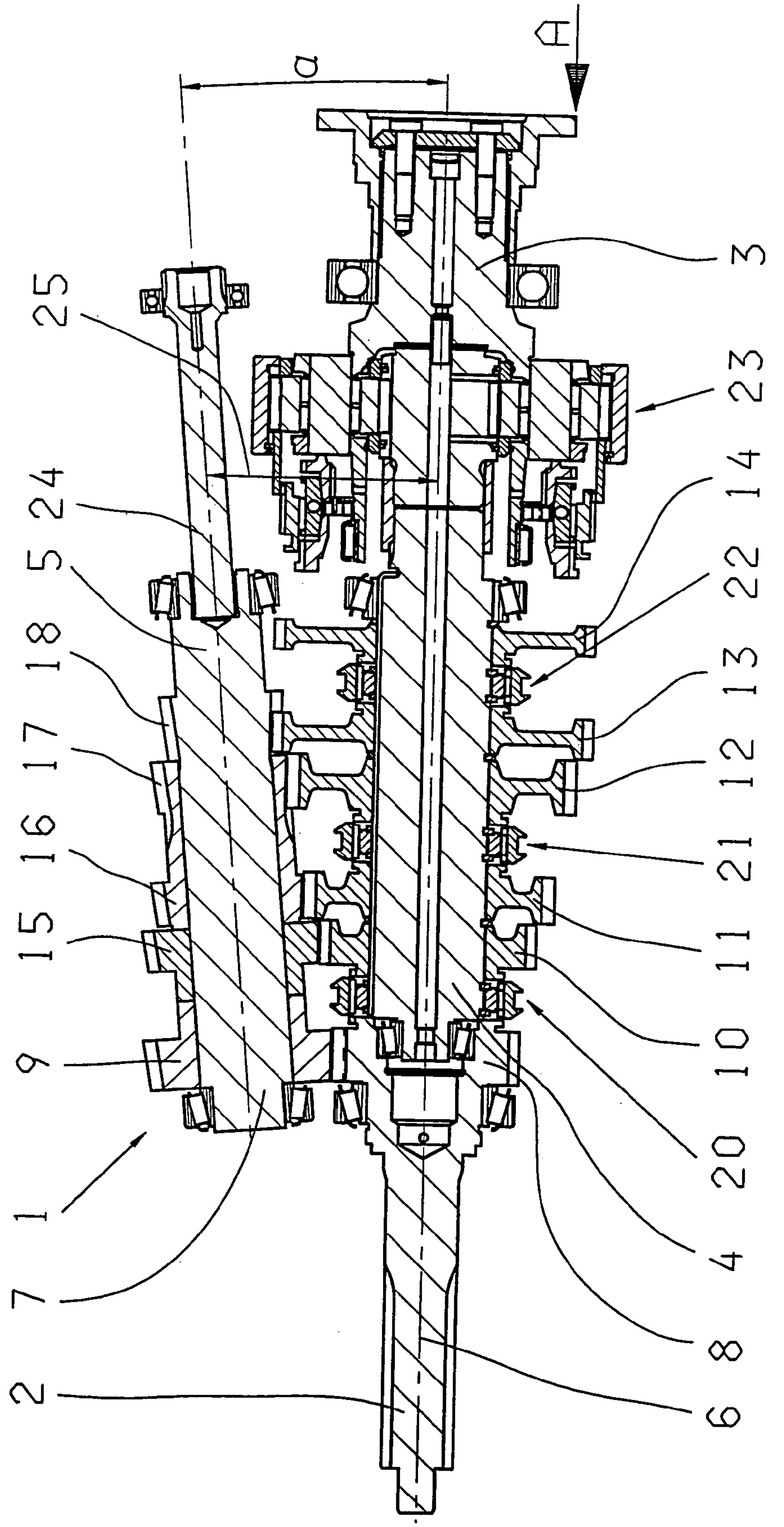
FIG. 1 is an inventive selector transmission with countershaft design in a first embodiment, the countershaft being disposed at an angle to the input shaft in cross-sectional representation.

An inventive selector transmission 1 (FIG. 1) essentially comprises one input shaft 2, one output shaft 3 with an output flange, the same as one main shaft 4 situated therebetween, the input 2, main 4 and output shafts 3 having a common axis of rotation 6. One countershaft 5 is disposed so that between axes of rotation 7 of the countershaft 5 and the axis of rotation 6 of the main shaft 4 an angle α results.

Gear wheel pairs 8, 9 connects the input shaft 2 with the countershaft 5 with one constant ratio on the input side. Upon the main shaft 4 are rotatably arranged other gear wheels 10, 11, 12, 13 and 14 which, by means of the synchronizer device 20, 21 and 22, can be respectively connected with the main shaft 4 for torque transmission. Upon the countershaft 5 are disposed, in addition to said gear wheels 10, 11, 12, and 13, corresponding gear wheels 15, 16, 17 and 18 which are equipped with a beveloid toothing. The gear wheel 14 on the main shaft 4 is designed as reverse gear wheel and connected with an intermediate shaft (not shown).

Upon the main shaft 4, one planetary gear set 23 is situated on the input side. In prolongation of the countershaft 5, an adapter shaft 24 is provided for connection with a power takeoff, the axis of rotation 6 of the input 2 or the main shaft 4 having a center distance 25 from the axis of rotation 7 of the countershaft 5 or adapter shaft 24. The center distance 25 is dimensioned exactly so that the adapter shaft 24 does not collide with the ring gear of the planetary gear set 23.

Alternatively to the above described design, the countershaft 5 (FIG. 2) of the selector transmission 1 can also be disposed paraxially with the input shaft 2. In FIG. 2 only the numbered parts are needed for explanation of the Figure. As to parts of essentially identical construction in FIG. 1 and FIG. 2 these are, for the sake of simplicity, also provided with the same reference numerals. The main shaft 4 is disposed tilted relative to the input shaft 2 so that the axis of rotation 6 of the input shaft 2 or the axis of rotation 7 of the countershaft 5 form an angle a relative to an axis of rotation 19 of the main shaft 4. A center distance 25 is adjusted between the axis of rotation 19 of the main shaft 4 and the axis of rotation 7 of the countershaft 5.

The output shaft 3 is disposed coaxially with the main shaft 4 and connected therewith.

Figure 2:
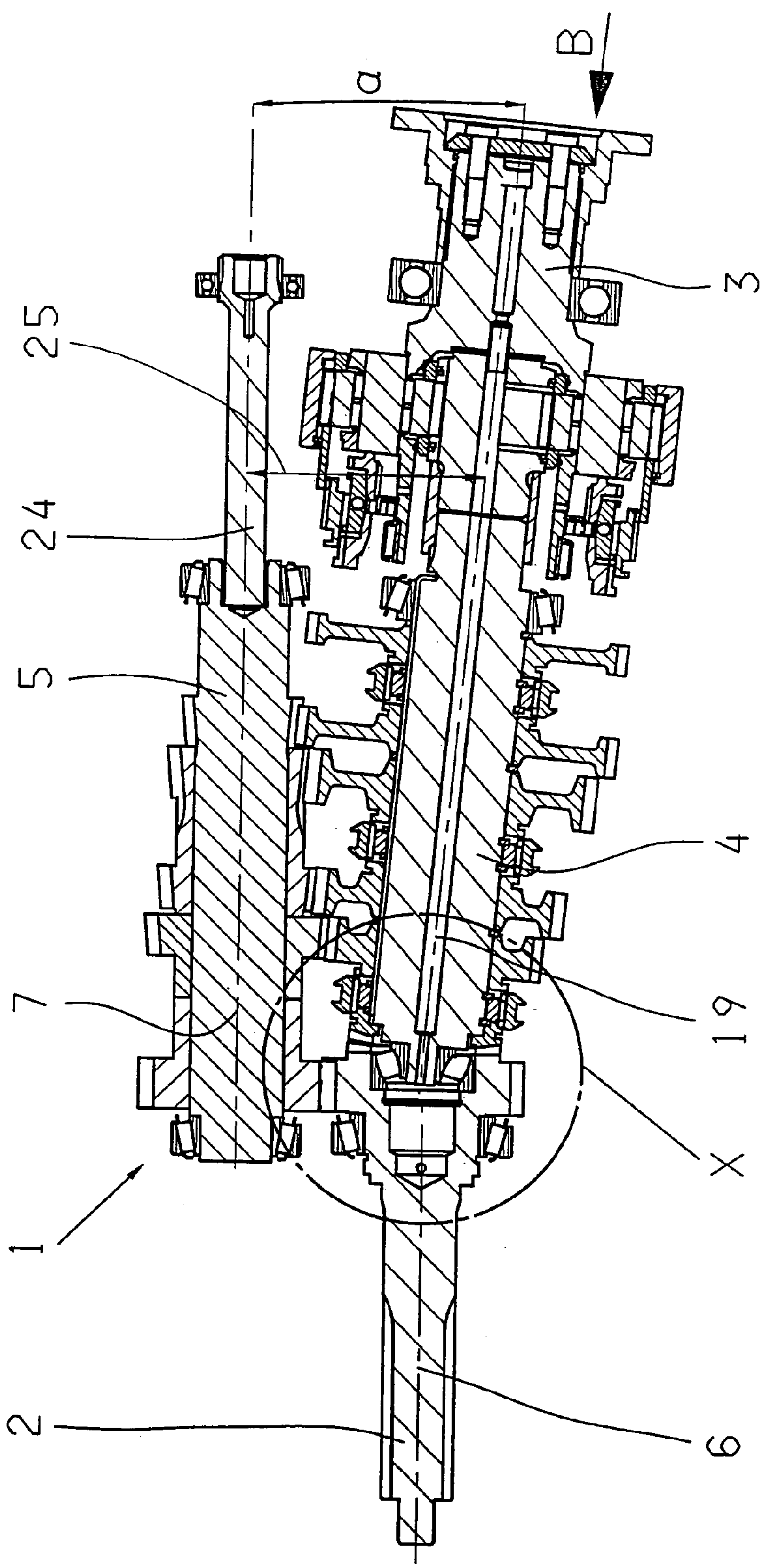
FIG. 2 is an inventive selector transmission in a second embodiment, the main shaft being disposed at an angle to the input shaft in cross-sectional representation.
Figure 3:
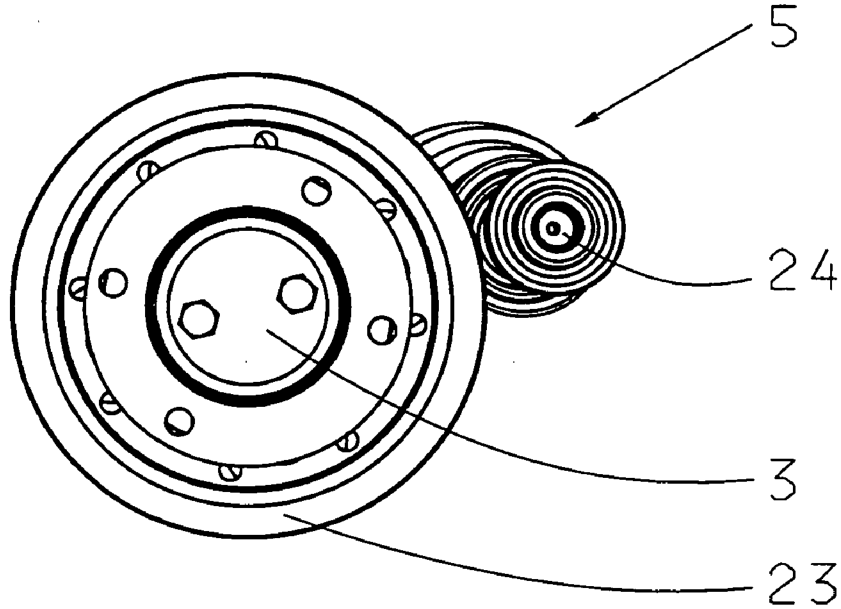
FIG. 3 is the selector transmission in a side view A according to FIG. 1.

In one view (FIG. 3) from a line sight A in FIG. 1 it is detected that the countershaft 5 with the adapter shaft 24 is located substantially at the side of the output shaft 3 and the planetary gear set 23.

Figure 4:
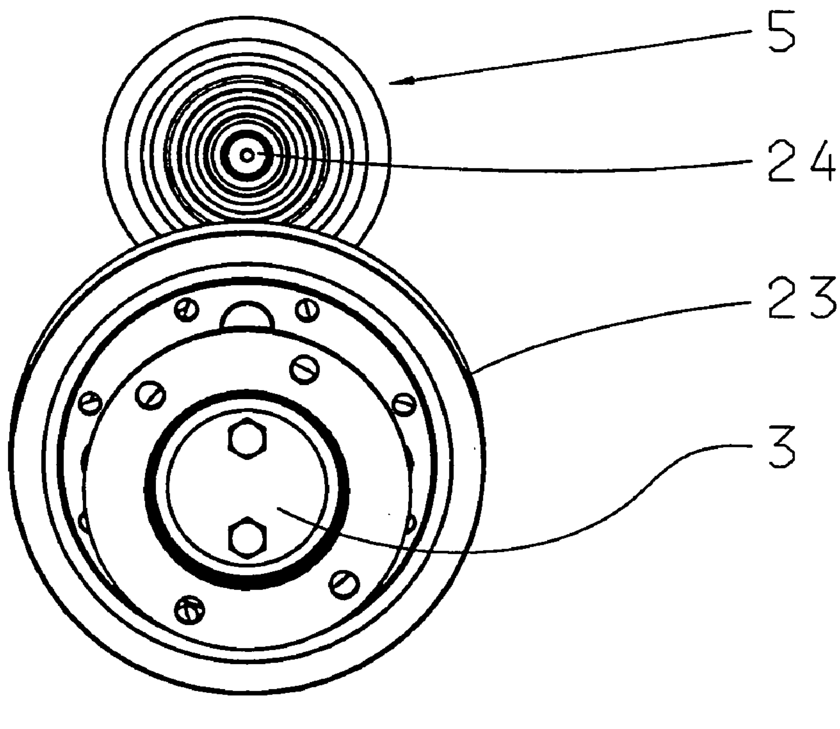
FIG. 4 is the selector transmission in a side view B according to FIG. 2.

In one view (FIG. 4) from a line sight B on the front side of the selector transmission 1 according to FIG. 2, it is detected that the countershaft 5 with the adapter shaft 24 is located substantially above the output shaft 3 with the planetary gear set 23.

Figure 5:
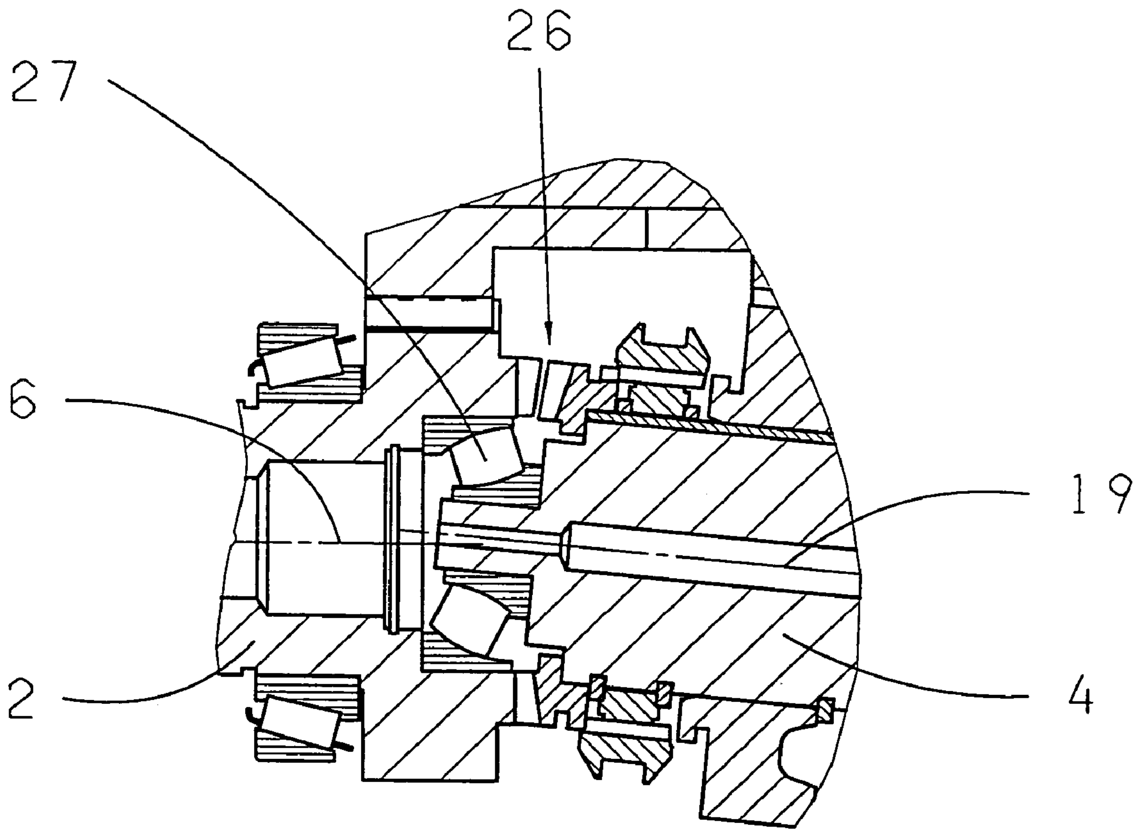
FIG. 5 is a detail X according to FIG. 2 in enlarged representation.

In an enlargement (FIG. 5) of a detail X from FIG. 2, on one hand, it becomes clear that between the input shaft 2 and the main shaft 4, one bevel drive 26 is provided. The later can be designed, for example, as a crown wheel or also as a beveloid drive. On the other hand, the main shaft 4 is rotatably supported in a hole of the input shaft 2 by means of an oscillating tapered roller bearing 27.

The selector transmission 1 can be used both for vehicle drive with one or with several countershafts. The selector transmission 1 can further be used with and without a power takeoff or an adapter shaft. The aforementioned selector transmission 1 can also be used as a selector transmission in a ship propulsion system wherein the design with one main shaft tilted, relative a main shaft, can also be advantageously used. A slanted position of spiral shaft can advantageously be implemented just by means of the design of the transmission.

REFERENCE NUMERALS

1 selector transmission
2 input shaft
3 output shaft
4 main shaft
5 countershaft
6 axis of rotation
7 axis of rotation
8 gear wheel
9 gear wheel

10 gear wheel
11 gear wheel
12 gear wheel
13 gear wheel
14 gear wheel
15 gear wheel
16 gear wheel
17 gear wheel
18 gear wheel
19 axis of rotation
20 synchronizer device
21 synchronizer device
22 synchronizer device
23 planetary gear set
24 adapter shaft
25 center distance
26 bevel drive
27 oscillating tapered roller bearing
α angle
A view
B view
X detail

The invention claimed is:

1. A selector transmission (1) with countershaft design comprising:
- an input shaft (2) connectable with a prime mover;
- an output shaft (3) connectable with at least one driving axis;
- a main shaft (4) situated therebetween and coaxial with the output shaft;
- a countershaft (5) interacting with said main shaft (4); and
- one or more shiftable gear wheel pairs being located upon said main shaft (4) and said countershaft (5), wherein said countershaft (5) is parallel spaced from said input shaft (2) and said main shaft (4) is at an angle (α) with, and directly supported by said input shaft (2).

2. The selector transmission according to claim 1, wherein in an installation position of said transmission (1), in a motor vehicle, said countershaft (5) is situated above said main shaft (4).

3. The selector transmission according to claim 1, wherein between said input shaft (2) and said main shaft (4), a bevel drive (26) is provided.

4. The selector transmission according to claim 3, further comprising an oscillating tapered roller bearing (27) between said input shaft (2) and said main shaft (4).

5. The selector transmission according to claim 3, wherein ideal points of rotation of said bevel drive (26) and of said oscillating tapered roller bearing (27) are identical.

6. The selector transmission according to claim 1, wherein one or more wheels of a gear wheel pair are designed as beveloid wheels.

7. The selector transmission according to claim 1, wherein said countershaft (5) is connected with an adapter shaft (24) for a power takeoff.

8. The selector transmission according to claim 7, wherein a center distance between said adapter shaft (24) and said main shaft (4) dimensioned so that a planetary gear set located on said main shaft (4) does not collide with said adapter shaft (24).

9. A selector transmission with countershaft in an industrial motor vehicle, the transmission (1) with countershaft comprising:
- an input shaft (2) connectable with a prime mover;
- an output shaft (3) connectable with at least one driving axis;
- a main shaft (4) situated therebetween and coaxial with the output shaft;
- a countershaft (5) interacting with said main shaft (4); and
- one or more shiftable gear wheel pairs being located upon said main shaft (4) and said countershaft (5), wherein said countershaft (5) is parallel spaced from said input shaft (32) and said main shaft (4)is at an angle (α) with, and directly supported by said input shaft (2).

10. A selector transmission with countershaft design in a ship propulsion system, wherein the transmission (1) with countershaft design comprising:
- an input shaft (2) connectable with a prime mover;
- an output shaft (3) connectable with at least one driving axis;
- a main shaft (4) situated therebetween and coaxial with the output shaft;
- a countershaft (5) interacting with said main shaft (4); and
- one or more shiftable gear wheel pairs being located upon said main shaft (4) and said countershaft (5), wherein said countershaft (5) is parallel spaced from said input shaft (32) and said main shaft (4) is at an angle (α) with and directly supported by said input shaft (2).

* * * * *